United States Patent [19]

Brown et al.

[11] 4,159,750
[45] Jul. 3, 1979

[54] ADAPTER FOR PRELOADING BEARINGS

[75] Inventors: Robert E. Brown, East Peoria; David L. Johnson; John F. Lindquist, both of Morton, all of Ill.

[73] Assignee: Caterpillar Tractor Co., Peoria, Ill.

[21] Appl. No.: 848,634

[22] Filed: Nov. 4, 1977

[51] Int. Cl.² ............................................. B62D 55/12
[52] U.S. Cl. .................................... 180/9.62; 81/53 R
[58] Field of Search ............... 180/9.62, 9.64; 305/29, 305/31, 32; 308/207 R, 207 A, 189 R, 189 A, 234; 81/53 R, 53 A, 54, 90 R, 90 B, 90 C, 90 D, 90 F, 90 E

[56] References Cited

U.S. PATENT DOCUMENTS

| 2,453,360 | 11/1948 | Burks | 180/9.62 |
| 2,459,672 | 1/1949 | Morsch | 81/53 R |
| 2,632,350 | 3/1953 | Kaster | 81/53 R |
| 3,978,935 | 9/1976 | Dauwalder | 180/9.62 |

FOREIGN PATENT DOCUMENTS 1432796 4/1976 United Kingdom ................ 308/207 A Primary Examiner—Joseph F. Peters, Jr.
Assistant Examiner—Gene A. Church
Attorney, Agent, or Firm—Wegner, Stellman, McCord, Wiles & Wood

[57] ABSTRACT

An adapter particularly suited for use in preloading bearings in the final drive of a crawler-type vehicle, including a plate adapted to be mounted concentrically with the sprocket shaft of a final drive, securing devices associated with the plate for securing the plate in concentric relation to the sprocket shaft, a stub shaft extending from one side of the plate, an arm rotatably mounted on the stub shaft and having a radial part extending beyond the periphery of the plate and an axial part terminating in an end on the side of the plate opposite of the stub shaft, a jaw mounted on the end of the arm and adapted to engage a bearing adjusting nut on the final drive, and a torque receiving formation on the arm for receiving a rotative force from a torque wrench or the like and being generally concentrically located with respect to the stub shaft.

7 Claims, 5 Drawing Figures

ADAPTER FOR PRELOADING BEARINGS

BACKGROUND OF THE INVENTION

This invention relates to adapters for adapting tools, such as torque wrenches, for use in establishing the preload on bearings through the adjustment of relatively inaccessible nuts such as are found in the final drive of crawler-type vehicles.

Many crawler-type vehicles in use today employ drive sprockets and associated components configured generally as illustrated in U.S. Pat. No. 2,453,360, issued Nov. 9, 1948 to Burks. Typically, there is employed a sprocket shaft which is stationarily mounted and which receives a rotatable quill which, in turn, mounts the drive sprocket. The quill is disposed concentrically about the shaft, but out of contact therewith by two sets of bearings, one set typically being mounted in a wall of a final drive housing and the other being mounted near the outer end of the shaft by a bearing cage holder or the like.

Such bearings must be properly loaded through adjustment of interengaging parts. If the loading on the bearing is less than what it should be, the fit of the parts is relatively sloppy with the consequence that wear will occur at an excessive rate, resulting in premature failure. Conversely, if the bearings are overly loaded, again, excessive wear will occur with the resultant shortened life of the apparatus.

Proper loading of the bearings is generally achieved by the application of a rotative force to an adjustment nut to a predetermined torque. The application of proper torque to the adjustment nut can be easily attained at a place of manufacture of a crawler-type vehicle before the application of the track to the vehicle. However, when servicing the vehicle in the field when the track is mounted on the sprockets, the track sufficiently overhangs the end of the sprocket shaft so as to make the adjustment nut relatively inaccessible. Heretofore, the nut has been adjusted with long-handled spanner wrenches, the long handle being necessary to provide sufficient leverage to achieve the desired torque levels. However, because of the long handle, such spanner wrenches can be applied only at an angle to the nut and may slip off during the adjustment process. Moreover, torque is extremely difficult to measure when applies in the manner and it has been impossible to utilize a ratchet device with the result that, in many instances, the spanner wrench, after undergoing only the limited amount of travel permitted by the vehicle components in view of the long handle on the wrench, must be removed from the nut and reapplied thereto.

Consequently, field servicing of such units to obtain proper loading of the bearings has been haphazard and timeconsuming.

SUMMARY OF THE INVENTION

The present invention is directed to overcoming one or more of the above problems.

According to the present invention, there is provided an adapter including a mounting plate. An eccentric and axially extending structure is rotatably mounted on the plate and nut engaging means are carried by the structure in spaced relation to the plate and to the axis of rotation of the structure. Torque applying means are removably attached to the structure.

Other objects and advantages will become apparent from the following specification taken in connection with the accompanying drawings.

DESCRIPTION OF THE DRAWINGS

FIG. 3 is a partial, sectional view taken approximately along the line 3—3 in FIG. 2;

FIG. 4 is a partial, sectional view taken approximately along the line 4—4 in FIG. 2; and FIG. 5 is a fragmentary, sectional view similar to FIG. 4 but of a modified embodiment of the invention.

DESCRIPTION OF THE PREFERRED EMBODIMENTS

Figure 1:
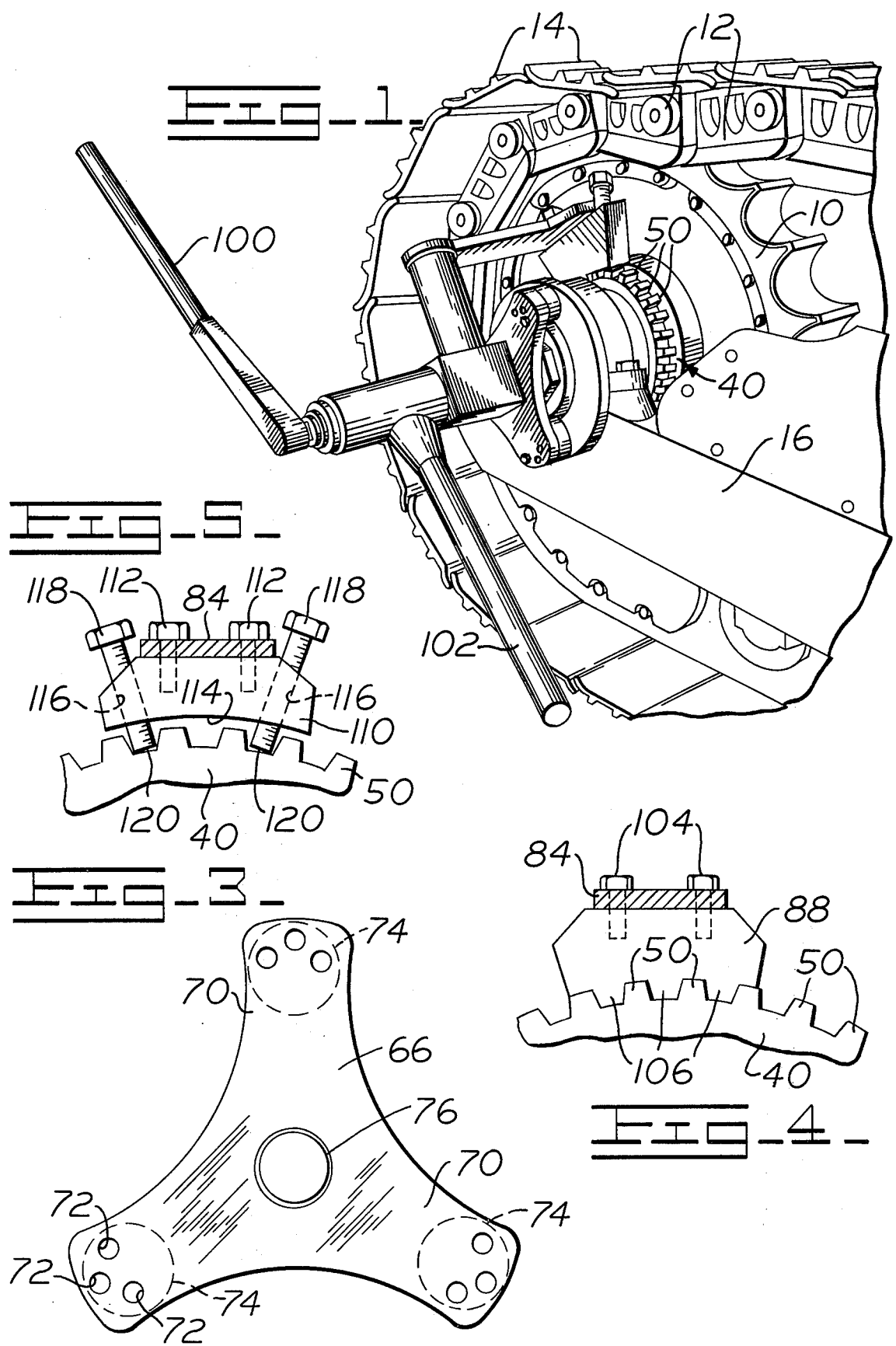
FIG. 1 is a fragmentary, perspective view of part of a crawler-type vehicle including a final drive and having an adapter made according to the invention applied thereto.

An exemplary embodiment of an adapter made according to the invention is illustrated in the drawings and, with reference to FIG. 1, is seen to be applied to the final drive of a crawler-type vehicle. The final drive mounts a drive sprocket 10 which engages pivotally interconnected track links 12 of the crawler track of the vehicle. Track shoes 14 are mounted on the track links 12 in a conventional fashion and extend a considerable distance to both sides of the sprocket 10. The vehicle includes a track frame 16 which is interconnected to the final drive in a conventional fashion.

Figure 2:
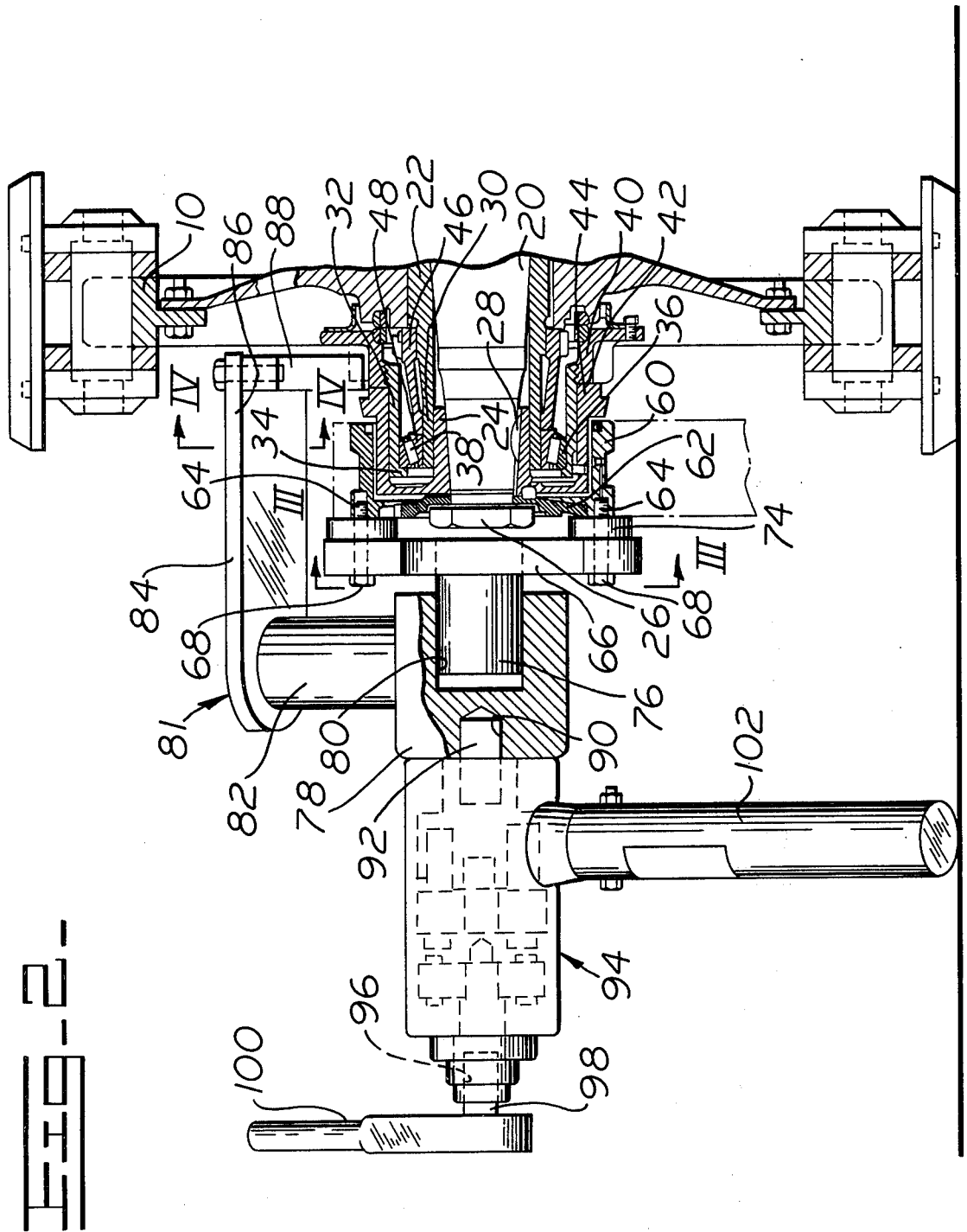
FIG. 2 is a fragmentary, sectional view of the final drive and the tool applied thereto.

As seen in FIG. 2, the final drive includes a sprocket shaft 20 which is stationarily mounted to a final drive housing (not shown) generally in the manner disclosed in the previously identified Burks patent. A quill 22 is concentrically disposed about, but spaced from the shaft 20 and is driven by means, not shown, to rotate the drive sprocket 10 which is secured in any suitable fashion to the quill 22. A bearing cage holder 24 is mounted on the end of the shaft 20 and securely held in place by a retention nut 26. The holder 24 is keyed to the shaft 20 by a key 28 and an end 30 of the quill extends into an annular space defined by the holder 24 and is slightly spaced therefrom for rotation relative thereto.

Within the annular space defined by the holder 24 there is disposed an adjustable cage holder 32 having a radially inwardly directed flange 34 at one end thereof. The outer race 36 of a bearing 38 is in engagement with the flange 34. Thus, by axially shifting the holder 32, the loading applied to the bearing 38 may be suitably adjusted along with the loading applied to a bearing (not shown) at the opposite end of the quill 22.

A nut 40 is threaded to the end of the holder 32 remote from the flange 34 and has a shoulder 42 which bears against the end of the outer wall 44 of the holder 24.

A spacer 46 is mounted on the quill 22 and bears against the inner race 48 of the bearing 38. As a consequence, when the nut 40 is rotated so as to axially shift the holder 32 to the right, as viewed in FIG. 2, the loading of the bearing 38 will be increased. Opposite rotation of the nut 40 will allow the holder 32 to move to the left, as viewed in FIG. 2, to lower the loading on the bearing 38. And, those skilled in the art will recognize that such movement also effects the loading on the bearing (not shown) mounting the quill 22 to the wall of the final drive housing.

As seen in FIG. 1, the outer perimeter of the nut 40 includes a plurality of radially outwardly directed, spaced teeth 50. To effect rotation of the nut 40, conventionally a spanner wrench has been applied to the teeth 50. However, it will be appreciated that by reason of the overhang of the track shoes 14, the wrench must be cocked if the handle of the same has any degree of length so as to avoid interference with the sides of the track shoes 14. Conversely, if the wrench does not have sufficient length as to interfere with the track shoes 14, it will be exceedingly difficult, if not impossible, to apply sufficient force thereto to effect rotation of the nut 40 to the extent that the desired loading of the bearing 38 and the other bearing (not shown) at the opposite end of the quill 22 is achieved.

According to the present invention, an adapter is employed. The typical final drive unit will include, in addition to the previously described components, a holder 60 partially surrounding the holder 24 and secured in place by a washer 62 captured by the retaining nut 26. A cap (not shown) is typically secured to the holder 60 by bolts received in threaded bores 64. The cap is removed along with the bolts received in the bores 64 and an adapter plate 66 is secured to the holder by bolts 68.

As best seen in FIG. 3, the adapter plated 66 has three, equally, angularly spaced, radially outwardly directed projections 70 and at the outermost extremity of each projection 70, there are located three bores 72. The bolts 68 extend through one of the bores 72 in each of the projections 70 to secure the adapter plate 66 against rotation relative to the sprocket shaft 20. The plurality of bores 72 in each projection 70 is utilized so as to enable use of the adapter plate with varying models of final drive units, the location of each of the three holes 72 on a given projection being unique to a particular type of model or a group of models.

Each of the projections 70 may be provided with a spacer 74 on one side of the plate 66 so as to space the plate 66 sufficiently outwardly from the retaining nut 26 to avoid interference. The side of the adapter plate oppositely of the spacer 74 mounts a centrally located stub shaft 76 which, when the adapter plate 66 is mounted on the final drive, will be concentric with the sprocket shaft 20.

A block 78 has an elongated bore 80 which may receive the stub shaft 76, thereby rotatably mounting the block 78 for pivotal movement about the axis of the stub shaft 76 and thus the sprocket shaft 20. The block 78 mounts an arm, generally designated 81, having a tube 82 defining a radially extending part and a plate 84 defining an axially extending part. The tube 82 has a sufficient length so as to extend beyond the periphery of the projections 70 of the adapter plate 66 while the plate 84 has a length sufficient to extend axially past the side of the adapter plate 66 opposite from the side mounting the stub shaft 76 to terminate in an end 86 substantially in the plane of the nut 40. A jaw 88 is carried by the end 86 and engages the teeth 50 on the periphery of the nut 40, as illustrated in FIGS. 1 and 2.

The block includes a square socket 90 opening to its side oppositely from the bore 76 but coaxially therewith. The socket 90 is adapted to removably receive the square lug 92 of a conventional torque multiplier 94 which may be of the type available from the assignee of the present application as Part No. 5P3508. The torque multiplier 94, oppositely of the lug 92, includes a square socket 96 which may removably receive a mating, square drive lug 98 of a conventional, ratchet-type torque wrench 100.

As is well known, the torque multiplier 94 includes an internal, reduction planetary gear mechanism whereby the rate of rotation of the torque wrench drive lug 98 is reduced at the drive lug 92 but the torque available at the latter increased approximately proportional to the gear ratio. A handle 102 is attached to the torque multiplier 94 and is held stationary when the torque wrench 100 is operated so that rotation of the latter will be applied, at a lesser rate, to the block 78 to effect rotation of the arm 81 on the stub shaft 76. Such rotation will be applied to the nut 40 from the jaw 88 which engages the teeth 50.

As seen in FIG. 4, the jaw 88 may be in the form of a block secured as by bolts 104 to the plate 84 at its end 86. The jaw 88 includes one or more radially inwardly directed teeth 106 which mesh with the teeth 50 on the nut 40.

An alternate form of a jaw is illustrated in FIG. 5 and utilizes a block 110 secured to the arm 84 at the end 86 by bolts 112. The radially inner side 114 of the block 110 is spaced from the teeth 50 and threaded bores 116 receive bolts 118. The radially inner ends 120 of the bolts 118 act as radially inwardly directed teeth which interengage with the teeth 50 on the nut 40. The radial position of the bolts 118 may be suitably regulated by rotation of the same within their respective bores 116 to adjust the radially innermost position of the ends 120. Thus, the bolts 118 in effect are radially adjustable teeth whose position can be adjusted as desired to accommodate differing models of the nuts 40.

In order to allow axial adjustment of the position of the jaw 88 with respect to the shaft 20, the bore 80 in block 78 is made sufficiently long so as to allow only partial receipt of the stub shaft 76, as illustrated in FIG. 2, and yet provide for adequate journalling of the block 78 about the axis of the shaft 20. Thus, axial adjustment can be achieved simply by slidably moving the block 78 to the right or the left as viewed in FIG. 2 on the stub shaft 76.

From the foregoing, it will be appreciated that an adapter made according to the invention provides ready access to relatively inaccessible bearing loading nuts such as are found in the final drives of crawler-type vehicles. It further enables the use of a torque multiplier such as that shown at 94 to apply large forces to the nut sufficient to achieve the desired loading with minimal effort on the part of the operator. It also enables the use of conventional ratchet type torque wrenches, such as the wrench 100, thereby eliminating the need for disassembly of the components when large travels of the nut 40 are required to attain the desired loading.

Furthermore, the torque applied to the nut 40 can be easily read off of the typical scale associated with the torque wrench 100 using a suitable multiplying factor established for the torque multiplier if the latter is used. Consequently, field servicing is greatly facilitated and the time required to perform the operation minimized.

The embodiments of the invention in which an exclusive property or privilege is claimed are defined as follows:

1. An adapter for use in preloading bearings in the final drive of a crawler-type vehicle, comprising:
    a plate having opposite sides and adapted to be mounted concentrically with the sprocket shaft of a final drive;

means associated with said plate for securing the plate in concentric relation to the sprocket shaft;
a stub shaft extending from one side of said plate;
an arm rotatably mounted on said stub shaft and having a radial part extending beyond the periphery of the plate and an axial part terminating in an end on the side of the plate opposite said one side;
A jaw mounted on said end and adapted to engage a bearing adjusting nut on the final drive; and
means on said arm for receiving a rotative force from a torque wrench or the like generally concentrically with said stub shaft.

2. The adapter of claim 1 further including a torque wrench coupled to said rotative force receiving means.

3. The adapter of claim 2 wherein said torque wrench is coupled to said rotative force receiving means by a torque multiplier.

4. An adapter for use with inaccessible nuts concentrically disposed about shafts to effect relative rotation between the same, comprising:
an adapter plate having opposite sides;
holes in said plate for receipt of fasteners whereby the plate may be secured against rotation relative to the shaft;
a stub shaft extending from one side of the plate and located to be generally concentric with the shaft when the plate is secured against rotation;
a block having a bore in one side rotatably receiving said stub shaft;
a tool receiving formation on the side of said block opposite said bore;
an arm mounted on said block and having an axial part radially outwardly of the periphery of said plate and terminating in an end on the side of said plate remote from said stub shaft; and
nut engaging means carried by said end.

5. An adapter for use with inaccessible nuts concentrically disposed about shafts to effect relative rotation between the same, comprising:
an adapter plate having opposite sides;
holes in said plate for receipt of fasteners whereby the plate may be secured against rotation relative to the shaft;
a stub shaft extending from one side of the plate and located to be generally concentric with the shaft when the plate is secured against rotation;
a block having a bore in one side rotatably receiving said stub shaft;
a tool receiving formation on the side of said block opposite said bore;
an arm mounted on said block and having a radial part extending radially outwardly of the periphery of the plate and an axial part extending axially from the radial part past and spaced from said plate periphery to terminate in an end on the side of the plate opposite said stub shaft; and
a jaw carried by said end and having at least one radially inwardly directed tooth for engagement with the periphery of a nut.

6. The adapter of claim 5 wherein said tooth is radially adjustable within said jaw.

7. An adapter comprising:
a mounting plate;
an eccentric and axially extending structure rotatably and axially adjustably mounted on said plate;
nut engaging means carried by said structure in spaced relation to said plate and to the axis of rotation of said structure; and
torque applying means removably attached to said structure.

* * * * *